United States Patent [19]

O'Connor

[11] Patent Number: 4,840,338

[45] Date of Patent: Jun. 20, 1989

[54] LOCKING TRIPOD LEG

[76] Inventor: Chadwell O'Connor, 2024 Galaxy Dr., Newport Beach, Calif. 92660

[21] Appl. No.: 101,504

[22] Filed: Sep. 28, 1987

[51] Int. Cl.$^4$ ............................................. F16M 11/32
[52] U.S. Cl. ................................ 248/168; 248/188.5; 248/409
[58] Field of Search ............... 248/677, 407, 408, 409, 248/411, 163.1, 166, 168, 169, 170, 171, 188.5, 188.8, 354.4

[56] References Cited

U.S. PATENT DOCUMENTS

| | | | |
|---|---|---|---|
| 373,303 | 11/1887 | Patzer | 248/411 |
| 507,044 | 10/1893 | Schmidt | 248/409 |
| 627,170 | 6/1899 | Austin | 248/166 |
| 880,063 | 2/1908 | Beilfuss | 248/188.5 |
| 1,186,707 | 6/1916 | Thorne | 248/163.1 |
| 1,495,458 | 5/1924 | Thalhammer | 248/169 |
| 1,517,825 | 12/1924 | Bruneau | 248/171 |
| 2,016,132 | 10/1935 | Bergslien | 248/409 |
| 2,442,000 | 5/1948 | Furnas, Jr. | 248/188.5 |
| 2,518,817 | 8/1950 | Ries | 248/168 |
| 2,519,549 | 8/1950 | Coutant | 248/188.5 |
| 2,794,612 | 6/1957 | Clifton | 248/188.5 |
| 3,963,207 | 6/1976 | Guasti | 248/168 |
| 4,196,881 | 4/1980 | Davidson | 248/169 X |

FOREIGN PATENT DOCUMENTS 677305  8/1952  United Kingdom ............... 248/168

Primary Examiner—J. Franklin Foss
Assistant Examiner—Robert A. Olson
Attorney, Agent, or Firm—Leydig, Voit & Mayer

[57] ABSTRACT

A tripod leg has upper and lower portions with the upper portion being secured at its upper end to the tripod head and having a housing guide at its lower end. The lower leg portion slides in the housing guide to adjust the total length of the leg. The lower leg portion is firmly clamped to minimize bending deflection. A strip of teeth on the lower leg portion are selectively engaged by elements on a locking block in the housing guide to fix the leg length, and the locking block is controlled from the top of the upper leg portion. Each leg of the tripod can be adjusted separately, or all three legs can be simultaneously adjusted. An over-centering, biased toggle linkage in the housing guide moves the locking block so that the clamping engagement is positive.

6 Claims, 4 Drawing Sheets

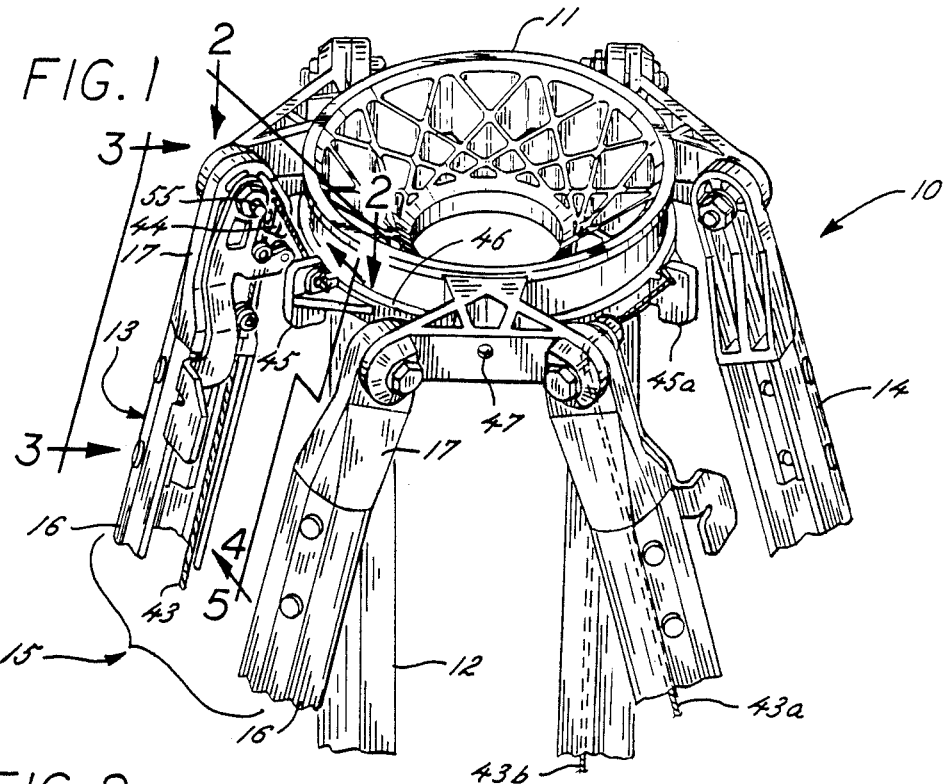
FIG. 1
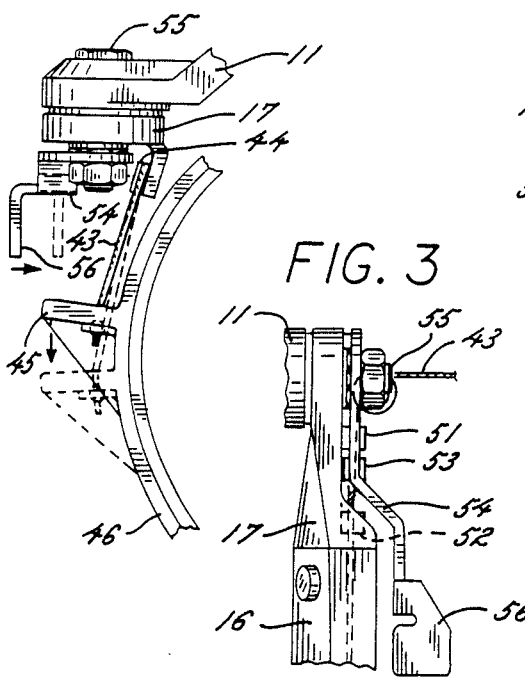
FIG. 2
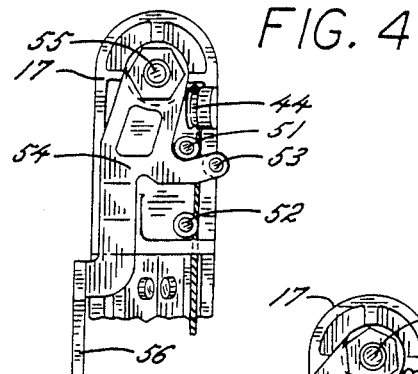
FIG. 3
FIG. 4
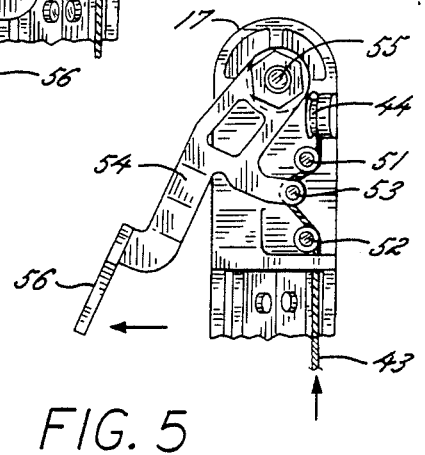
FIG. 5

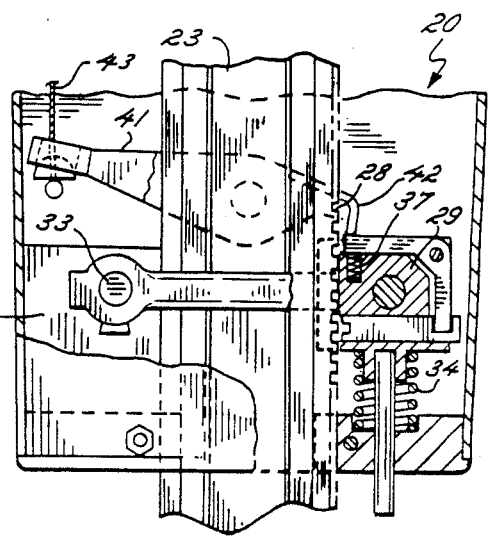
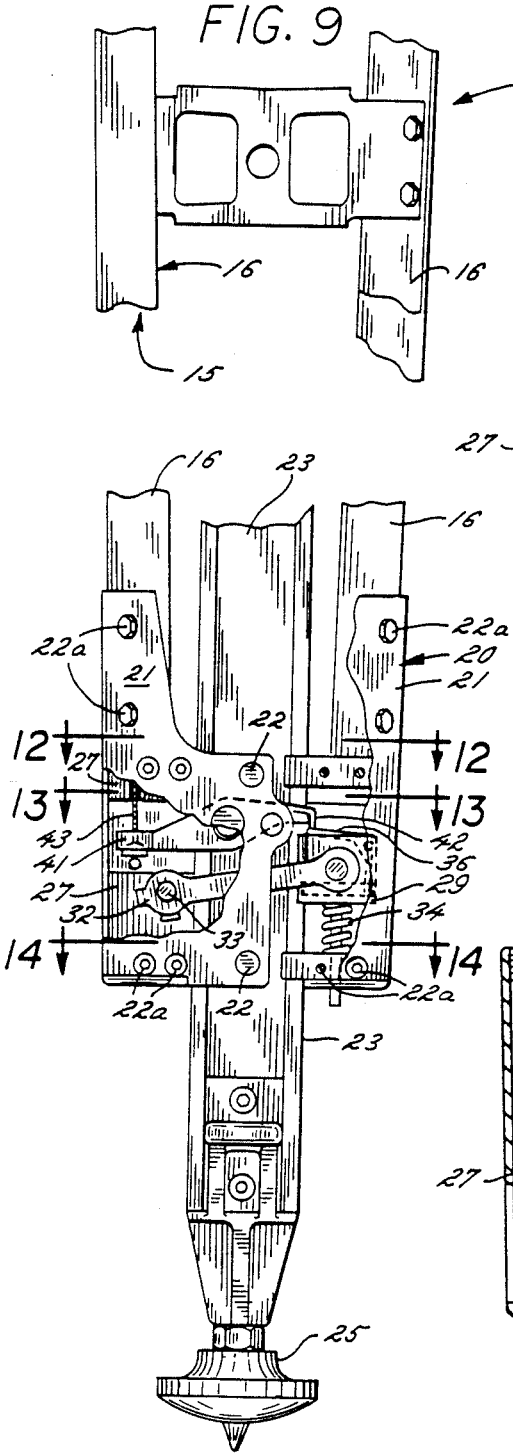
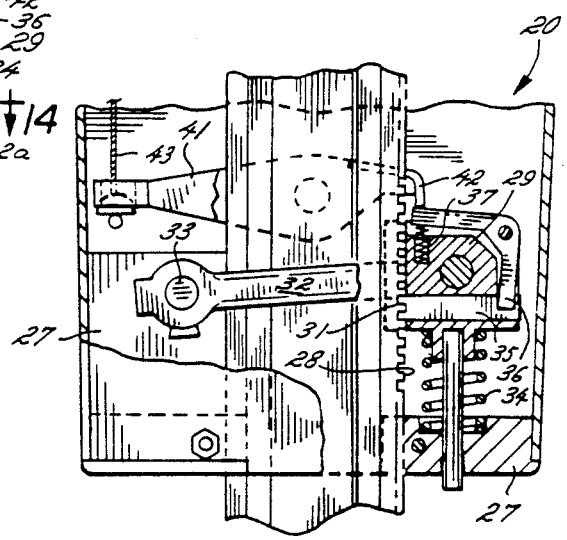

LOCKING TRIPOD LEG

BACKGROUND

This invention generally relates to instrument, such as camera, supporting tripods and more particularly concerns adjustable length tripod legs.

A desired attribute of a tripod is obviously rigid stability, but in a sense not always fully appreciated. Resistance to horizontal linear movement at the tripod head is less critical than is resistance to torsional, i.e., rotational, deflection of the tripod head. This is because a camera panhead typically imposes drag on rotational panning movement of the camera. The drag force tends to rotate the tripod head, and if the tripod deflects under this loading, when the camera is stopped and the loading released, the deflection will unwind and the camera will be turned in the direction opposite to that in which it was being panned. Particularly with long focus lenses, even slight movement of this kind will be readily apparent in the continuing image taken by the camera.

It will be apparent that the legs of a tripod for supporting an instrument should be longitudinally rigid when set at a desired adjustable length. For some uses, such as firmly supporting a movie or TV camera, it is desirable to control the leg length adjustment quickly so as to be able to set up the camera rapidly for operation. Still more rapid setup can be accomplished if the camera can be left secured to the tripod head and the tripod leg adjustment made while the camera is under the operator's physical control.

Accordingly, it is an object of the present invention to provide a tripod with adjustable length legs whose leg length adjustment can be made while operator is gripping and controlling the tripod head with an attached instrument.

It is a related object to provide a tripod of the foregoing kind which combines free sliding movement of a portion of the tripod legs for close incremental adjustment through the adjustment range together with rigid positive locking at the adjusted length.

A further object is to provide a tripod of the above type which maintains rigidity against torsional deflection about a vertical axis so that there is no backlash movement after a drag load has been imposed during panning.

Another object is to provide a tripod as characterized above that is economical to manufacture and trouble-free to use.

SUMMARY

The tripod leg has upper and lower portions with the upper portion being secured at its upper end to the tripod head and having a housing guide at its lower end. The lower leg portion slides in the housing guide to adjust the total length of the leg. A strip of teeth on the lower leg portion are selectively engaged by elements on a locking block in the housing guide to fix the leg length, and the locking block is controlled from the top of the upper leg portion. An over-centering, biased toggle linkage in the housing guide moves the locking block so that the locking engagement is positive. The locking block cooperates with elongated guide elements so as to firmly clamp the lower leg portion against bending relative to the upper portion. The invention resides in controlling the release of the leg portions from the top of the leg; having a fixed, positive, mechanical lock between the leg portions as a result of the toggle linkage; and clamping the leg portions against bending deflection.

DRAWINGS

Other objects and advantages of the invention will become apparent upon reading the following detailed description and upon reference to the drawings, in which:

FIG. 1 is a fragmentary perspective of the top of a tripod with legs embodying the invention;

FIG. 2 is a fragmentary plan taken approximately along the line 2—2 in FIG. 1;

FIG. 3 is a fragmentary elevation taken approximately along line 3—3 in FIG. 1;

FIGS 4 and 5 are fragmentary elevations taken approximately along the line 4, 5 in FIG. 1 and showing parts in alternate operating positions;

FIG. 9 is a partial elevation showing the approximate center and lower portions of one of the legs appearing in FIG. 1;

Figure 6:
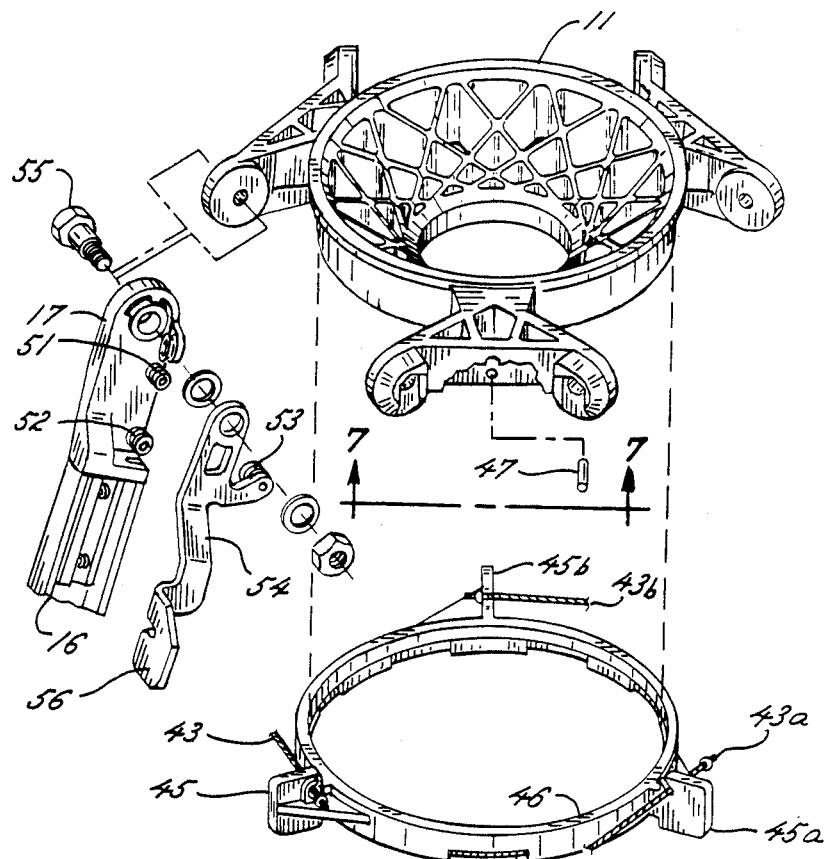
FIG. 6 is an exploded perspective showing parts otherwise appearing in FIG. 1.
Figure 7:
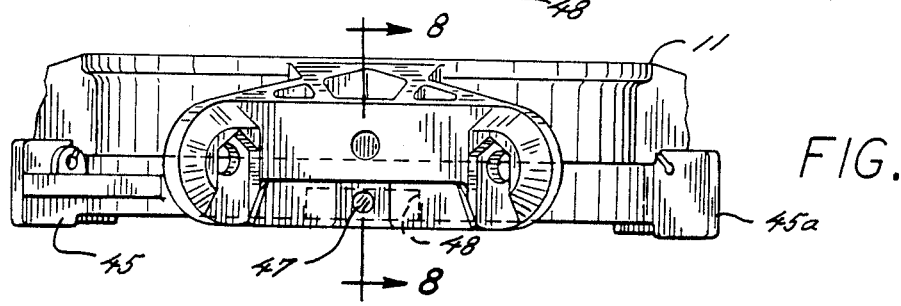
FIG. 7 is a fragmentary elevation taken approximately along the line 7—7 in FIG. 6.
Figure 8:
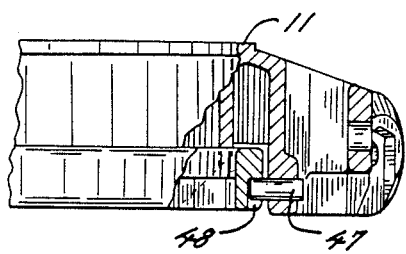
FIG. 8 is a fragmentary section taken approximately along the line 8—8 in FIG. 7.
Figure 12:
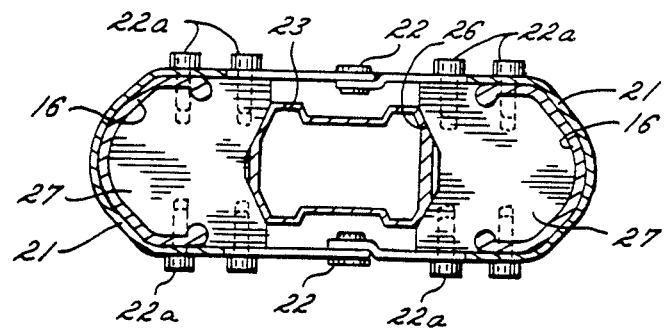
Figure 13:
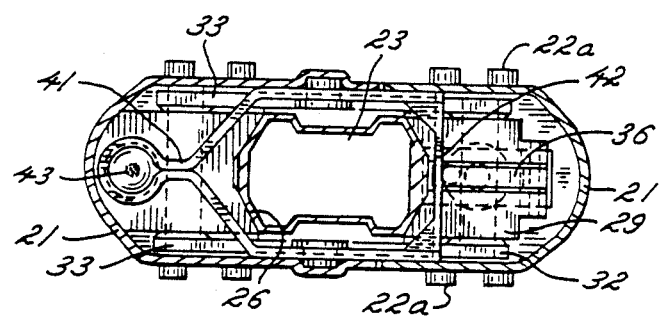
Figure 14:
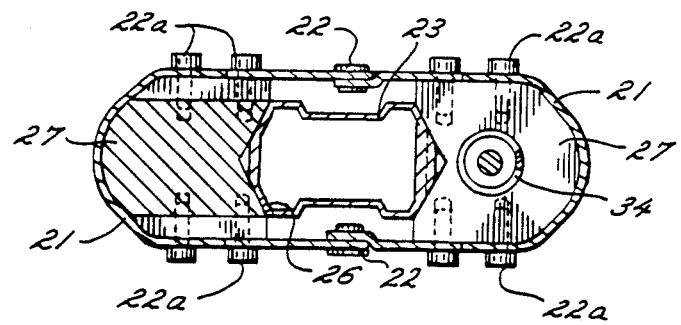

FIGS. 10 and 11 are slightly enlarged sections of a portion of the shown in FIG. 9 and with operating parts shown in different positions; and FIGS. 12, 13, and 14 are sections taken along the respective lines 12—12, 13—13 and 14—14 in FIG. 9.

DESCRIPTION

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown a tripod 10 having a head 11 on which three tripod legs 12, 13 and 14 are pivoted. Preferably, all three legs are alike, and only the leg 13 will be described in detail.

The leg 13 includes an elongated upper portion 15 formed of bars 16 carrying, at their upper ends, metal fittings 17 that are pivoted to the head 11. The lower end of the bars are fixed to a housing guide 20 that constitutes the lower end of the upper leg portion 15. The guide 20 includes a pair of opposed U-shaped cover plates 21 secured to the bars 16 and to each other, via rivets 22 and screws 22a.

The leg 13 also includes an elongated lower leg portion 23, preferably formed of extruded metal having a uniform cross section through a leg adjustment range which, as shown, is substantially the entire length of the leg portion 23. The lower leg portion 23 ends with a conventional pointed fitting 25 for piercing engagement with the ground.

The housing guide 20 is formed with a guide passage 26 (see FIG. 12) closely receiving the uniform cross section of the leg portion 23, so that the leg portion 23 is in sliding relationship with the guide 20 and the upper and lower leg portions 15, 23 can slide longitudinally and adjust the total leg length. The sliding fit is close so that there can be no bending movement between the leg portions, and, preferably, bearing-like slide elements 27 are mounted in the housing guide 20 for closely supporting the leg portion 23.

For locking the leg portions 15, 23, a locking strip of teeth 28 are formed on the leg portion 23 and a locking block 29 with a plurality of locking elements 31 is movably mounted in the housing guide 20. The block 29 is pivoted between arms 32 which in turn are pivoted at axis 33 on one of the elements 27. With the arms perpendicular to the leg portion 23 (FIG. 10), the block is slightly spaced from the leg portion. A strong coiled spring 34 urges the block 29 upwardly about the axis 33 so that the block normally firmly bears against the leg portion 23 (FIG. 11).

In keeping with the invention, the clamping force of the block 29 against the leg portion 23 is intermediate the elongated contact of the slide elements 27 on the opposite side of the leg portion. This gives a rigid clamping action holding the lower leg portion against bending in the plane of the upper leg portion 15—that plane being defined by the two bars 16.

If the tripod head 11 is loaded torsionally about its center vertical axis, the most likely deflection to be expected would be bending of the tripod legs in the surface of the cone defined by the three legs. This bending can be resisted by making the leg assemblies rigid in the plane of the typical leg assembly that is tangent to the cone surface defined by all three leg assemblies. The upper leg portion 15 is made rigid by forming its bars 16 as a triangle well spaced at the head 11 and tapering to a near point at the guide housing 20. The lower leg portion is fitted into that triangle and held rigid with respect to that plane by the clamping action of the block 29 against the slide elements 27.

The fact that the bars 16 defining the upper leg portion 15 are not parallel, but rather form the triangle referred to, is significant since, under torsional load, one of the bars 16 is loaded in compression and the other one in tension so that the resistance to deflection does not depend on the rigidity of the connections at the ends of the bars as would be the case if the bars were parallel. As a result, the tripod 10 is significantly more resistant to torsional deflection than would be a construction having legs formed of substantially parallel bars.

The positive locking elements 31 are formed on a slide 35 mounted in the block 29. With the locking elements 31 fitted in the teeth 28, there is positive locking against the lower leg portion 23 sliding relative to the upper leg portion 15. The slide 35 is engaged by one arm of a bell crank 36 that is pivoted on the block 29. A coil spring 37 fitted in the block 29 bears on the other arm of the bell crank as to bias the bell crank clockwise in FIGS. 10 and 11 and normally urge the locking elements 31 toward the teeth 28.

Separating the function of clamping via the block 29 from the function of positive locking via the teeth 31 on the slide 35, permits the clamping force to be higher. The arms 32 are proportioned so as to cause the block 29 to just clear the teeth 28 when the arms are perpendicular to the leg portion 23—the maximum distance the block 29 can be moved by the arms 32 from the leg portion 23. If the elements 31 were formed on the block 29, that clearance distance would have to be much greater to clear the elements 31 from the teeth 28. With the clearance small, the arms 32 overcenter to a slight angle so that a vertical load through the leg 13 is greatly multiplied to clamp the block 29 against the leg portion 23. If the block 29 had to be move further, as to clear elements 31 from the teeth 28, the final angle of the arms 32 would be greater and the clamping force multiplication would be much less.

In carrying out the invention, the clamping and locking action of the block 29 and the elements 31, for each of the tripod legs 12–14, is controlled from the upper end of those legs, with the control making it possible to normally release each leg individually or all three simultaneously. A lever 41, open in the center to surround the lower leg portion 23 (see FIG. 13) is pivoted in the housing guide 20 and formed with an edge 42 engaging the top of the bell crank 36. A cable 43 has its lower end anchored to the other end of the lever 41, and the cable 43 runs up through one of the open centered bars 16 to pass around a pulley 44 journalled on one of the fittings 17 with the upper end of the cable secured to a tab 45 on a control collar 46. The collar 46 rotates beneath the head 15, being held in position by a plurality of pins 47 that are secured in the head 11 and which fit in slots 48 formed on the collar 46.

The tripod user, by applying finger or thumb pressure on the tab 45, can rotate the control collar so as to tension the cable 43 and turn the lever 41 clockwise so as to, first, operate the bell crank 36 to release the elements 31 and, second, to push the entire block 29 against the force of the spring 34 so as to unclamp the lower leg portion.

By making sure that the spring 37 is sufficiently strong, the slide 35 is moved to engage the elements 31 with the teeth 28 while the block 29 is still sliding into clamping engagement with the leg portion 28. This sequence insures that the locking is positive before the leg portion 23 is clamped against any further relative sliding movement.

Each of the tripod legs has a similar mechanism including cables 43a and 43b anchored to tabs 45a and 45b on the control collar 46 so that rotating the control collar releases all of the lower tripod leg portions simultaneously. In order to release an individual leg, the cable 43, just before reaching the pulley 44, passes between a pair of smaller pulleys 51 and 52 journalled on the fitting 17 and another small pulley 53 journalled on a lever 54 that is pivoted on one of the bolts 55 securing the leg 13 to the head 11. The lever 54 has a gripping tab 56, and the tripod user, by pulling the tab 56 outwardly, pulls the small pulley 53 between the opposed pulleys 51, 52, effectively shortening the length of the cable 43 and operating the lever 41 to unlock and unclamp the lower leg portion 23. Each of the legs 12–14 has a lever corresponding to the lever 54 and an arrangement of pulleys corresponding to the pulleys 51–53 so that each leg can be similarly released individually.

The leg construction and control of the tripod 10 permits a camera operator to carry his camera attached to the tripod head 11 with the tripod legs 12–14 fully collapsed for compactness. Typically, the tripod-camera would be carried on the operator's shoulder. To set up quickly, the operator can swing the tripod-camera down forwardly while pulling out one of the levers 54 to release one lower tripod leg portion 23; usually the forward tripod leg is first positioned. When the released leg portion 23 falls to the ground, releasing the associated lever 54 locks that leg, and the other two levers 54 can be operated to drop the remaining two lower leg portions 23. The tripod legs can then be spread and the leg length adjusted to complete the set-up. With a bit of practice, the set-up can be done almost in one motion, with the operator's hands remaining at the tripod head to physically locate the camera and operate the tripod.

The operator need not be concerned with whether or not the tripod legs are securely locked, since the biased over-centering mechanisms controlling the blocks 29 and the locking elements 31 insure a solid clamping of the lower leg portions to the upper leg portions and positive locking engagement against sliding movement.

The triangular configuration of the upper leg portions together with the firm solid clamping action of the over-centering block 29 also provides the desired rigidity that resists any tripod backlash at the completion of a panning operation.

To quickly recollapse the tripod, the control collar 46 can be rotated and the camera and tripod head lowered on the released legs. Once the legs are again fully collapsed, removal of finger pressure on the control collar allows the clamping and locking mechanisms to again engage.

I claim as my invention:

1. A leg for a tripod comprising, in combination, an elongated upper leg portion adapted to be secured to a tripod head at its upper end, a housing guide rigidly secured to the lower end of said upper leg portion, a lower leg portion having a uniform cross section through a leg adjustment range, said housing guide having a guide passage closely receiving said uniform cross section in sliding relationship so that said upper and lower leg portions can slide longitudinally and adjust the total leg length without there being bending movement between the leg portions, said lower leg portion having a locking strip along said uniform cross section, a locking block moveably mounted in said guide housing and having a locking element engagable with said strip, an over-centering linkage in said guide housing connected to said locking block for moving the same, means for biasing said linkage to a just over-centered condition whereat said locking block locking element is held in engagement with said strip, means controllable from said upper end of said upper leg portion to move said locking block so as to engage and disengage the locking element with the adjacent locking strip, and said means controllable from the upper end of said upper leg portion including a connection for pivoting said linkage against said bias so as to move said locking block element out of engagement with said strip, whereby the leg portions can freely slide to a desired leg length when the strip is disengaged and the leg portions are locked together when the strip is engaged.

2. A tripod comprising, in combination, a tripod head, three elongated leg assemblies secured at their upper ends to said head, each of said leg assemblies having upper portions rigid in a plane, said planes forming a triangle at said head and being at approximately 120° angles from the adjacent planes, each leg assembly having a lower portion slidably mounted in the upper portion for selectively extending the length of the leg assemblies, means in each leg assembly for clamping the lower portion to the upper portion to prevent relative movement in the plane of that leg assembly, means in each leg assembly for locking the lower portion against sliding movement in the upper portion, and means on said head for releasing both the clamping means and the locking means of each leg assembly, said means for releasing permitting operation of the locking and clamping means of each leg assembly either simultaneously or each leg assembly individually.

3. A leg for a tripod comprising, in combination, an elongated upper leg portion adapted to be secured to a tripod head at its upper end, a housing guide rigidly secured to the lower end of said upper leg portion, a lower leg portion having a uniform cross section through a leg adjustment range, said housing guide having a guide passage closely receiving said uniform cross section in sliding relationship so that said upper and lower leg portions can slide longitudinally and adjust the total leg length without there being bending movement between the leg portions, said housing guide having at least one bearing surface on one side of said lower leg portion, a locking block moveably mounted in said guide housing on the other side of said lower leg portion, said lower leg portion having a locking strip along said uniform cross section, said locking block having a locking element engagable with said strip, means automatically actuated by the engagement of the locking block with the locking strip and the presence of a compressive load on the tripod leg for generating a clamping force between the bearing surface and the locking block, said means for generating a clamping force comprising at least one link the opposite ends of which are pivotally mounted to a fixed portion of said housing guide and said locking block, one end of said link moving with the locking block and causing the locking block and bearing surface to clamp against the opposite sides of the lower leg portion when the compressive load is applied to the tripod leg, the clamping force increasing as the load on the tripod leg increases, and means controllable from said upper end of said upper leg portion to move said locking block so as to engage and disengage the locking element with the adjacent locking strip, whereby the leg portions can freely slide to a desired leg length when the strip is disengaged and the leg portions are locked and clamped together when the strip is engaged.

4. A tripod comprising, in combination, a head having spaced mounting points for each of three leg assemblies, a leg assembly having an upper leg portion with elongated elements connected at their upper ends to two of said mounting points and having their lower ends connected to a housing guide, said housing guide being narrower than said mounting points so that said elements are not parallel, said leg assembly including a lower leg portion mounted in said housing guide for sliding movement so that said upper and lower leg portions can slide longitudinally and adjust the total leg length, a set of guide elements in said housing guide for holding said lower leg portion, said guide elements being substantially in the plane of said elongated elements and having spaced contact on one side of said lower leg portion and contact intermediate said spaced contact on the other side of said lower leg portion, and means controlled from said head for selectively firmly clamping said guide elements against said lower leg portion, said means comprising at least one link the opposite ends of which are pivotally mounted to guide elements on opposite sides of said lower leg portion, and means for causing the guide element intermediate the space contact to move with the lower leg portion when a load is applied to the tripod leg to cause the set of guide elements to clamp against the opposite sides of the lower leg portion, said means for clamping automatically increasing the clamping force as the load on the tripod increases.

5. A tripod comprising, in combination, a tripod head, three elongated leg assemblies secured at their upper ends to said head, each of said leg assemblies having upper portions rigid in a plane, said planes forming a triangle at said head and being at approximately 120° angles from the adjacent planes, each leg assembly having a lower portion slidably mounted in the upper portion for selectively extending the length of the leg assemblies, means in each leg assembly for clamping the lower portion to the upper portion to prevent relative movement in the plane of that leg assembly, said means for clamping comprising at least one element with a bearing surface on each side of the lower leg portion, means for causing one of said elements to move with said lower leg portion, and at least one link the opposite ends of which are pivotally mounted between said elements, said link causing the bearing surfaces of the elements to clamp against the lower leg portion when a load is applied to the tripod leg, said means for clamping automatically increasing the clamping force as the load on the tripod increases, means in each leg assembly for locking the lower portion against sliding movement in the upper portion, and means on said head for releasing both the clamping means and the locking means of each leg assembly.

6. A leg for a tripod comprising, in combination, an elongated upper leg portion adapted to be secured to a tripod head at its upper end, a housing guide rigidly secured to the lower end of said upper leg portion, a lower leg portion having a uniform cross section through a leg adjustment range, said housing guide having a guide passage closely receiving said uniform cross section in sliding relationship so that said upper and lower leg portions can slide longitudinally and adjust the total leg length without there being bending movement between the leg portions, said housing guide having at least one bearing surface on one side of said lower leg portion, a locking block moveably mounted in said guide housing on the other side of said lower leg portion, said lower leg portion having a locking strip along said uniform cross section, said locking block having a locking element engagable with said strip, means automatically actuated by the engagement of the locking block with the locking strip and the presence of a compressive load on the tripod leg for generating a clamping force between the bearing surface and the locking block, said means for generating a clamping force comprising at least one link the opposite ends of which are pivotally mounted to a fixed portion of said housing guide and said locking block, one end of said link moving with the locking block and causing the locking block and bearing surface to clamp against the opposite sides of the lower leg portion when the compressive load is applied to the tripod leg, the clamping force increasing as the load on the tripod leg increases, and means to move said locking block so as to engage and disengage the locking element with the adjacent locking strip, whereby the leg portions can freely slide to a desired leg length when the strip is disengaged and the leg portions are locked and clamped together when the strip is engaged.

* * * * *

UNITED STATES PATENT AND TRADEMARK OFFICE
CERTIFICATE OF CORRECTION

PATENT NO. : 4,840,338
DATED : June 20, 1989
INVENTOR(S) : Chadwell O'Connor

It is certified that error appears in the above-identified patent and that said Letters Patent is hereby corrected as shown below:

Col. 1, l. 34, insert --the-- before "operator"

Col. 2, l. 14, insert --the-- before "line"
       l. 28, insert --structure-- before "shown"

Col. 6, l. 59, delete "space" and substitute --spaced--

Signed and Sealed this

Ninth Day of July, 1991

Attest:

HARRY F. MANBECK, JR.

*Attesting Officer*

*Commissioner of Patents and Trademarks*